(12) United States Patent
Simmons

(10) Patent No.: US 7,448,973 B2
(45) Date of Patent: Nov. 11, 2008

(54) BELT TENSIONER AND METHOD

(76) Inventor: Stanley Simmons, 1425 Hillcrest St., Mesquite, TX (US) 75149-2234

( * ) Notice: Subject to any disclaimer, the term of this patent is extended or adjusted under 35 U.S.C. 154(b) by 366 days.

(21) Appl. No.: 10/949,969

(22) Filed: Sep. 24, 2004

(65) Prior Publication Data

US 2005/0079939 A1    Apr. 14, 2005

Related U.S. Application Data

(60) Provisional application No. 60/509,826, filed on Oct. 9, 2003.

(51) Int. Cl.
  *F16H 7/08* (2006.01)
(52) U.S. Cl. .................. 474/114; 474/101; 474/113
(58) Field of Classification Search ................ 474/101, 474/109, 139, 113–117; 254/54, 67, 100, 254/126
  See application file for complete search history.

(56) References Cited

U.S. PATENT DOCUMENTS

| | | | | |
|---|---|---|---|---|
| 1,270,101 | A * | 6/1918 | Basel | 474/117 |
| 2,205,176 | A * | 6/1940 | Sauer | 474/115 |
| 2,970,587 | A * | 2/1961 | Estes | 474/113 |
| 3,306,121 | A * | 2/1967 | Jenkins | 474/117 |
| 3,325,095 | A | 6/1967 | Mueller et al. | |
| 3,422,692 | A * | 1/1969 | Woodring | 474/136 |
| 3,477,670 | A * | 11/1969 | Sloyan | 474/115 |
| 3,631,734 | A * | 1/1972 | Wagner | 474/117 |
| 3,679,176 | A | 7/1972 | Campbell | |
| 3,727,884 | A | 4/1973 | Custer | |
| 3,920,219 | A | 11/1975 | Hendrix, Jr. | |
| 3,922,927 | A * | 12/1975 | Shiki et al. | 474/113 |
| 4,017,059 | A * | 4/1977 | Laine | 254/100 |
| 4,244,559 | A | 1/1981 | Mote | |
| 4,380,326 | A | 4/1983 | Marzorati et al. | |
| 4,437,648 | A | 3/1984 | Thorn et al. | |
| 4,512,752 | A * | 4/1985 | Brenneman | 474/114 |
| 4,529,170 | A | 7/1985 | Whitt, Sr. et al. | |
| 4,540,387 | A | 9/1985 | Epino | |
| 4,571,221 | A * | 2/1986 | Isobe et al. | 474/115 |
| 4,583,961 | A * | 4/1986 | Kawasawa et al. | 474/113 |
| 4,618,336 | A * | 10/1986 | Isobe et al. | 474/114 |
| 4,708,320 | A | 11/1987 | Hodges | |
| 5,002,518 | A * | 3/1991 | Pennatto | 474/113 |
| 6,030,305 | A * | 2/2000 | Hood | 474/109 |

* cited by examiner

*Primary Examiner*—Marcus Charles
(74) *Attorney, Agent, or Firm*—John E. Cepican

(57) ABSTRACT

A threaded member is coupled to a ring. The ring is adapted to engage a washer of a bolt-washer combination which is used to movably secure a generator or other device to a bracket, frame or other fixed structure. A saddle is adapted to engage a portion of the bracket or frame. The threaded member passes through an opening formed in the saddle, and a rotatable member threadably engaged with the threaded member is rotated to apply a force to the bracket or frame, thereby moving the generator or other belt-driven device in a desired direction relative to the bracket or frame to adjust the tension level on the belt.

1 Claim, 2 Drawing Sheets

BELT TENSIONER AND METHOD

RELATED APPLICATION

This patent application claims the benefit of U.S. Provisional Patent Application Ser. No. 60/509,826, entitled "Belt Tensioner and Method," filed Oct. 9, 2003, the disclosure of which is incorporated herein by reference.

TECHNICAL FIELD OF THE INVENTION

This invention relates generally to the field of automotive tools and, more particularly, to a belt tensioner and method.

BACKGROUND OF THE INVENTION

Adjusting the level of tension in a belt, such as an automobile belt, is generally accomplished by using a leverage bar or some other type of device to force a generator or other belt-driven device in a desired direction to increase the tension level in a corresponding belt. While forcing the belt-driven device in a desired direction, a clamping bolt or other type of fastener is tightened. The tension on the belt is then checked and the procedure repeated until a desired or recommended level of tension in the belt is obtained. Normally, the procedure must be repeated several times to obtain the desired or recommended tension level. Additionally, at least two people may be required to perform the procedure.

SUMMARY OF THE INVENTION

The present invention comprises a tool for easily adjusting the tension of a "V-belt" or other type of belt that transmits rotational energy from a driver pulley to a driven pulley such as an automotive generator. The present invention comprises a threaded member coupled to a ring. The ring is adapted to engage a washer of a bolt-washer combination which is used to movably secure a generator or other device to a bracket, frame or other fixed structure. The present invention also comprises a saddle adapted to engage a portion of the bracket or frame. The threaded member passes through an opening formed in the saddle, and a member, threadably engaged with the threaded member, is rotated to apply a force to the bracket or frame, thereby moving the generator or other belt-driven device in a desired direction relative to the bracket or frame to adjust the tension level on the belt.

DETAILED DESCRIPTION OF THE DRAWINGS

The present invention comprises a tool for easily adjusting the tension of a "V-belt" that transmits rotational energy from a driver pulley to a driven pulley such as an automotive generator. The present invention alleviates using a leverage bar or other device for adjusting a belt to a desired or recommended level of tension.

Figure 1:
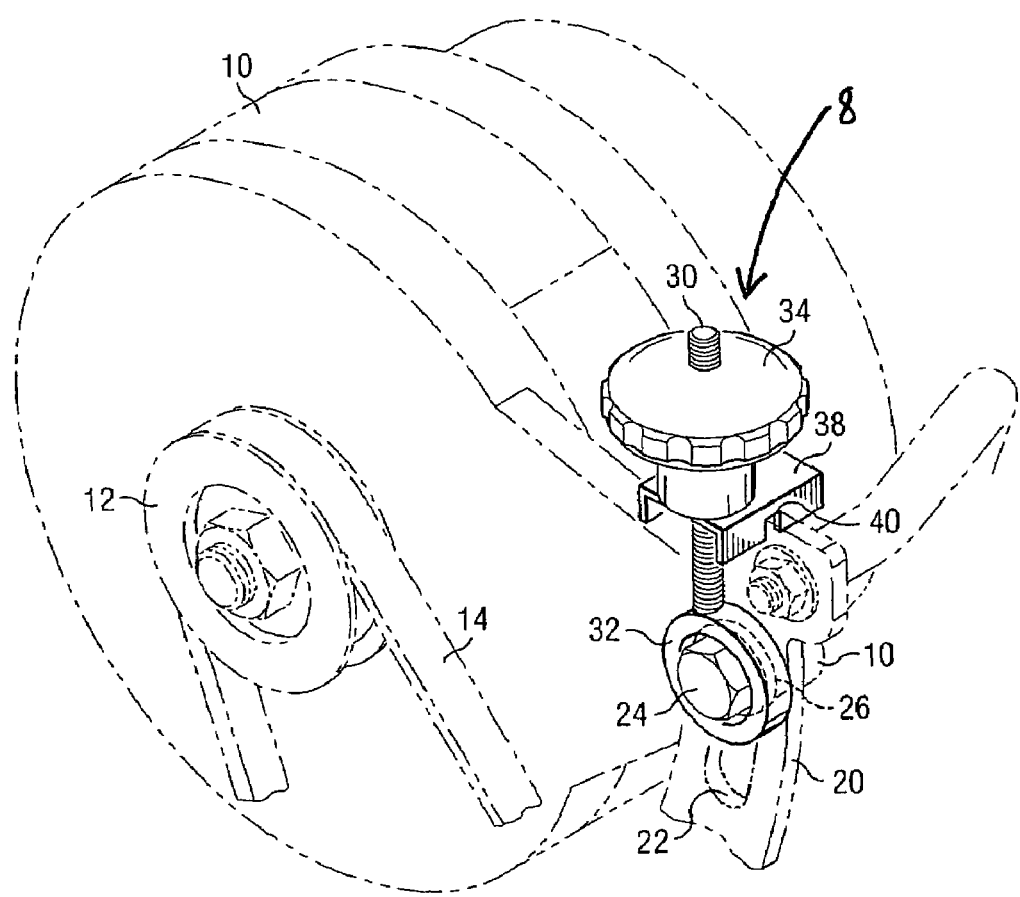
FIG. 1 is a partially fragmentary, perspective view illustrating a belt tensioner in accordance with one embodiment of the present invention.
Figure 2:
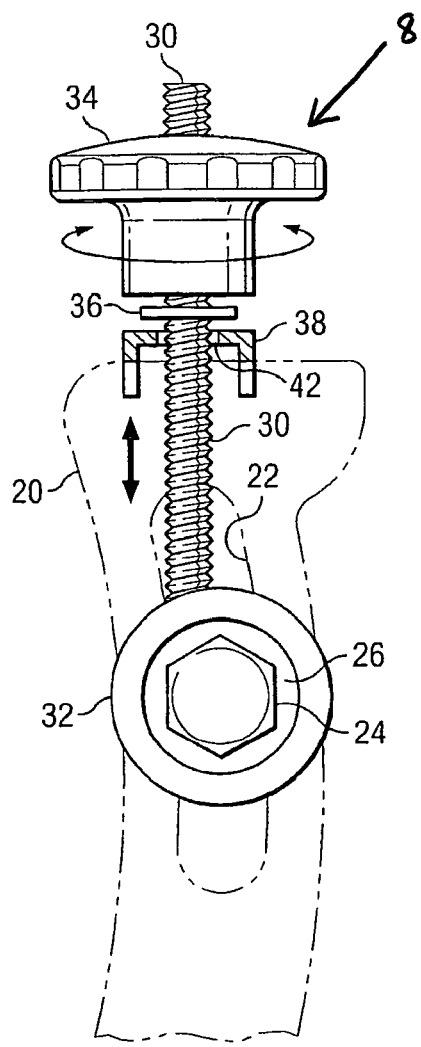
FIG. 2 is an enlarged, fragmentary, front elevational view of the embodiment of FIG. 1.
Figure 3:
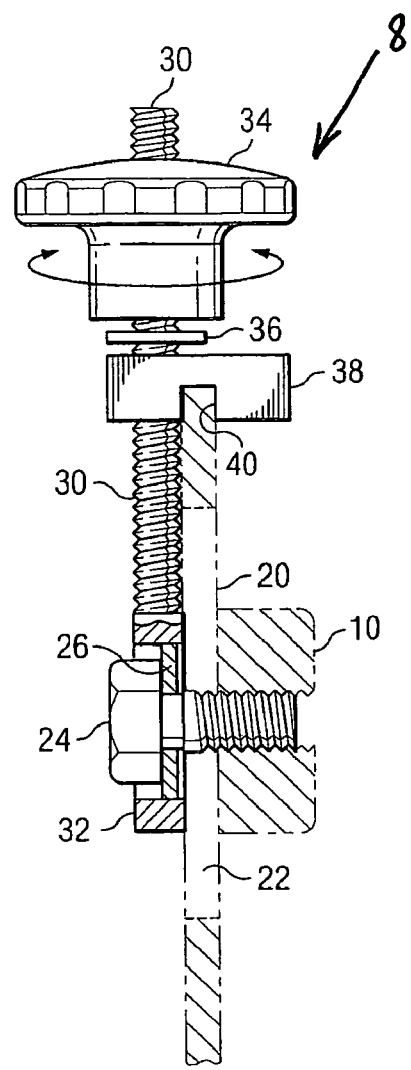
FIG. 3 is an enlarged, fragmentary, front elevational view of the embodiment of FIG. 1.

According to the embodiment illustrated in FIGS. 1-3, a belt tensioner 8 of the present invention comprises an internally threaded rotatable member 34, a thrust washer 36, a saddle 38 having oppositely disposed slots 40, and a threaded member 30 coupled to a ring 32. Threaded member 30 extends through an opening 42 formed in saddle 38. In FIGS. 1-3, the belt tensioner 8 is illustrated as being used in connection with adjusting the tension of a belt 14 coupled to a pulley 12 of a generator 10. In the embodiment illustrated in FIGS. 1-3, threaded member 30 comprises a cylindrical rod; however, it should be understood that other types of members may be used (e.g., all or a portion thereof being non-cylindrical). Additionally, it should be understood that member 30 may be formed having threads partially or entirely along its length. Further, in the embodiment illustrated in FIGS. 1-3, member 34 comprises a knob; however, it should be understood that any device or element adapted to engage and rotate in cooperation with threads disposed on threaded member 30 may be used.

In operation, bolts securing generator 10 in a fixed position are loosened except for a clamping bolt 24. The saddle 38 is positioned relative to a support structure, such as a generator bracket 20, such that slots 40 engage the top edge of generator bracket 20. Ring 32 is positioned to engage a securing element, such as a lock-washer 26 which is used in combination with bolt 24 to secure generator 10 to the support structure. Thrust washer 36 is positioned between member 34 and saddle 38. Member 34 is then rotated clockwise a sufficient amount to prevent generator 10 from moving freely while clamping bolt 24 is loosened. Clamping bolt 24 may then be loosened slightly to allow movement of generator 10. Member 34 may then be rotated clockwise to increase belt 14 tension or rotated counter-clockwise to decrease belt 14 tension to a desired or recommended level of tension. After a desired or recommended level of tension on belt 14 has been obtained, clamping bolt 24 may be re-tightened to a desired or recommended setting. The remaining generator 10 bolts may also then be re-tightened to desired or recommended settings. Member 34 may then be rotated counter-clockwise and tensioner 8 removed from generator bracket 20. If desired, the level of tension on belt 14 may be rechecked.

Figure 4A:
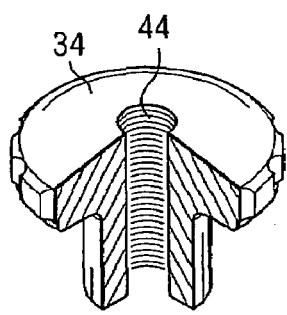
FIG. 4A is an enlarged, partially cut-away, perspective view illustrating an alternate embodiment of a tightening member of the belt tensioner illustrated in FIGS. 1-3.
Figure 4B:
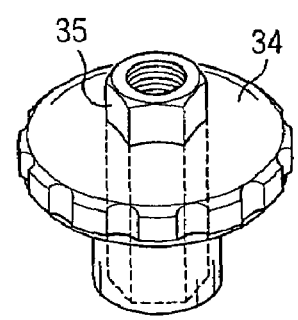
FIG. 4B is an enlarged perspective view illustrating an alternate embodiment of a tightening member of the belt tensioner illustrated in FIGS. 1-3.

FIGS. 4A and 4B are drawings illustrating alternate embodiments of member 34. In FIG. 4A, member 34 comprises an internally threaded passage 44 for engaging threads of member 30. In the embodiment illustrated in FIG. 4B, member 34 comprises an extending encapsulated nut 35 for engaging corresponding threads of member 30. Nut 35 may also be used as a means for engaging a torque wrench or other type of device with member 34 for measuring or otherwise correlating the level of tension in a belt to the amount of torque applied to member 34.

What is claimed is:

1. A belt tensioner for use with a generator or alternator having a driven pulley, an engine having a driving pulley, a V-belt engaging said pulleys, the generator or alternator being pivotally mounted to a first engine flange and slidably mounted to a second engine flange, said belt tensioner comprising:

a saddle, having slot structure formed therein, for removably engaging the second engine flange;

a threaded member, said saddle having a bore formed therethrough, said threaded member passing through said bore;

a ring attached to a first end of said threaded member, said ring removably fittable over the generator or alternator slidable mount to the second engine flange;

a rotatable member threaded over an opposite second end of said threaded member, said rotatable member threadable along said threaded member to engage said saddle, press said saddle against the second engine flange, draw said threaded member through said saddle, thereby moving said ring toward said saddle, thereby moving the generator or alternator slidable mount in the second engine flange;

said rotatable member thereafter being threadable away from said saddle, said saddle movable along said threaded member to disengage the second engine flange, said ring then movable to disengage from the slidable mount.

* * * * *